(12) United States Patent
Brandt et al.

(10) Patent No.: US 12,067,166 B2
(45) Date of Patent: Aug. 20, 2024

(54) TOUCH PANEL WITH HAPTICAL FEEDBACK AND REDUCED REFLECTION

(71) Applicant: HARMAN BECKER AUTOMOTIVE SYSTEMS GMBH, Karlsbad (DE)

(72) Inventors: Peter Brandt, Pfinztal (DE); Wieland Oberst, Kraichtal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 17/622,538

(22) PCT Filed: Jun. 25, 2019

(86) PCT No.: PCT/EP2019/066835
§ 371 (c)(1),
(2) Date: Dec. 23, 2021

(87) PCT Pub. No.: WO2020/259809
PCT Pub. Date: Dec. 30, 2020

(65) Prior Publication Data
US 2022/0357796 A1  Nov. 10, 2022

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 2203/04107* (2013.01)

(58) Field of Classification Search
CPC .............. G06F 3/016; G06F 3/0412; G06F 2203/04107; G06F 2200/1631; G06F 1/1626; G06F 3/03547
See application file for complete search history.

(56) References Cited

U.S. PATENT DOCUMENTS

| 6,118,435 | A | 9/2000 | Fujita et al. |
| 10,131,571 | B2 * | 11/2018 | Oudard .................... G02B 1/12 |
| 11,312,237 | B2 * | 4/2022 | Kratz ..................... B60K 37/06 |

(Continued)

FOREIGN PATENT DOCUMENTS

| JP | 2017054068 A | * | 3/2017 |
| KR | 20140143236 A | | 12/2014 |

(Continued)

OTHER PUBLICATIONS

International Search Report issued Feb. 26, 2020 for PCT Application No. PCT/EP2019/066835 filed Jun. 25, 2019, 4 pages.

(Continued)

*Primary Examiner* — Ricardo Osorio
(74) *Attorney, Agent, or Firm* — Brooks Kushman P.C.

(57) ABSTRACT

A touch panel system is provided, which comprises a display unit, a touch sensor structure and a coverglass. A user touches the coverglass during touch input to the touch sensor structure, and the coverglass is configured to be moved relative to the display unit for providing haptical feedback to the user. Therein, the coverglass is mounted in a predetermined distance d from the display unit such that the coverglass and the display unit are decoupled from each other by an empty space to define opposite internal surfaces, which are coated with an anti-reflecting coating such as a moth eye film.

19 Claims, 5 Drawing Sheets

(56) References Cited

U.S. PATENT DOCUMENTS

| | | | |
|---|---|---|---|
| 2009/0075092 A1* | 3/2009 | Varaprasad | C03C 17/002 |
| | | | 428/428 |
| 2009/0128503 A1 | 5/2009 | Grant et al. | |
| 2011/0012845 A1 | 1/2011 | Rothkopf et al. | |
| 2013/0044282 A1* | 2/2013 | Kuwabara | B32B 17/08 |
| | | | 313/504 |
| 2013/0314648 A1* | 11/2013 | Rappoport | G02F 1/133502 |
| | | | 349/137 |
| 2014/0184933 A1* | 7/2014 | Park | G06F 3/0446 |
| | | | 349/12 |
| 2015/0220116 A1 | 8/2015 | Kemppinen et al. | |
| 2016/0196421 A1* | 7/2016 | Kitada | G06F 21/31 |
| | | | 455/411 |
| 2018/0284892 A1* | 10/2018 | Kwon | G06F 3/0416 |
| 2018/0284936 A1* | 10/2018 | Vummidi Murali | G06F 3/0418 |

FOREIGN PATENT DOCUMENTS

| | | |
|---|---|---|
| WO | 2015000381 A1 | 1/2015 |
| WO | 2019023724 A1 | 2/2019 |

OTHER PUBLICATIONS

International Preliminary Report on Patentability and Written Opinion issued Dec. 28, 2021 for PCT Application No. PCT/EP2019/066835 filed Jun. 25, 2019, 7 pages.

First Chinese Office Action dated Feb. 28, 2024 for Chinese Application No. 201980096952.9 filed Nov. 29, 2021, 18 pgs.

European Office Action dated Apr. 26, 2024 for European Application No. 19736612.3 filed Nov. 19, 2021, 7 pgs.

First Indian Office Action dated Jun. 19, 2024 for Indian Application No. 202247002984 filed Jan. 19, 2022, 5 pgs.

* cited by examiner

TOUCH PANEL WITH HAPTICAL FEEDBACK AND REDUCED REFLECTION

CROSS-REFERENCE TO RELATED APPLICATION

This application is the U.S. national phase of PCT Application No. PCT/EP2019/066835 filed on Jun. 25, 2019, the disclosure of which is incorporated in its entirety by reference herein.

TECHNICAL FIELD

Various examples of the invention generally relate to a touch interface, and specifically to a touch panel system with haptical feedback, as well as to a method for a touch panel system to provide haptical feedback.

BACKGROUND

A touchpanel system consists of a display unit, a touch sensor and a coverglass bonded on the sensor surface, or a touch sensor applied directly on the coverglass backside. Actuators are configured to move the complete unit including the display module, and if applicable the backlight unit, in an x, y or z direction, in response to the sensor detecting a touch signal. The actuators provide a haptical feedback to the user by moving the display, sensor and coverglass. The disadvantages of existing touch panel systems are the accelerated masses of the display, touch panel and coverglass, wherein unwanted noise is emitted from the system, much energy is needed and system costs are increased due to the high masses that have to be accelerated.

Therefore, the idea of the presented approach is to provide an advanced touch panel system and a method for operating a touch panel system, which overcome or mitigate at least some the above-identified limitations and drawbacks.

SUMMARY

This is done by the subject matter of the independent claims. Further advantageous features are subject matter of the dependent claims.

The solution according to the invention is described with respect to the claimed touch panel systems as well as with respect to the claimed methods for operating a touch panel system. Features, advantages, or alternative embodiments herein may be assigned to the other claimed objects and vice versa. In other words, claims for the methods of operating a touch panel may be improved with features described or claimed in the context of the touch panel systems, and the claims for the touch panel systems may be improved with features described or claimed in the context of the methods. In this case, the functional features of the method may be embodied by respective objective units of the touch panel system.

A touch panel system is provided, which comprises a display unit for displaying information to a user on a display surface of the display unit. In other words, graphical information may be displayed to the user on the display surface of the display unit. The touch panel system further comprises a touch sensor structure, which is configured for detecting touch input by the user. The touch sensor structure may be touch sensor based on a known touch sensor technique, or any combination of known touch sensor techniques. In various embodiments, the touch sensor structure may extend along the display surface, or at least a part of the display surface. A user may provide touch input to the touch panel system in reaction to the displayed information to the user on the display surface, wherein the touch input is provided on the coverclass by touching the coverglass at a specific location directly, or perpendicular, over a location of the display surface, which may correspond to a location of graphical information displayed on the display surface. In other words, for a touch input by the user to the touch panel system, the user may touch the coverglass, which covers the touch sensor structure and the display surface towards the user. Therein, a user perceives graphical information displayed on the display surface of the display unit through the coverglass extending along the display surface, and/or extending along the touch sensor structure. A coverglass may relate to a transparent plate, through which the graphical information on the display unit can be perceived by the user, and which is delimiting the touch panel system mechanically to the outside towards the user. It is to be appreciated that the material of the coverglass is not limited to a glass material, wherein any suitable transparent material can be used as known in the art.

The coverglass is movable in relation to the display unit for providing haptic feedback to the user. In other words, the touch panel system may be configured to display information to the user on the display unit, detect and receive touch input, which the user provides to the touch sensor by touching the coverglass on a location directly over the display surface on which the user perceives the displayed information, and haptical feedback is provided to the user by moving, e.g. vibrating, the coverglass in relation to the user body part, or stylus, while the user is touching the coverglass. Therein, the coverglass is configured to be moved in relation to the display unit (or the display surface of the display unit), for providing the haptic feedback to the user. Thus, by moving the coverglass, the haptical feedback may be provided to the user.

In various examples, the coverglass may be configured and mounted in the touch panel system in such a way that the coverglass can move as a whole relative to the display unit, and/or relative to the backlight unit, and/or to the other components of the touch panel system. Therein, the coverglass may be attached to at least one actuator and/or to the touch panel system outside the viewing area or visible area of the display.

In various examples, the coverglass may be moved in relation to the user, i.e. the finger of the user touching the coverglass, wherein the display unit is not moved, or actuated, in relation to the user, i.e. the display unit is not moved by at least one actuator which moves the coverglass. In other words, the display unit may not be moved for inducing movement of the coverglass in relation to the user, or the user body part touching the coverglass. In other words, the coverglass, or a coverglass assembly including a touch sensor structure, which may be movable in relation to the display unit, is moved or vibrated or actuated by at least one actuator, to give haptic feedback by the coverglass to the user. The coverglass may not be connected, or coupled, or bonded, or fixed to the display unit, so that the display unit may not be moved together with the coverglass, in a parallel or corresponding movement, while giving haptical feedback to the user. In some embodiments, only the coverglass may be moved by an actuator for providing haptic feedback, the actuator may be coupled only to the coverglass, or may be coupled to the coverglass and a static object such as a housing or support structure outside the touch panel system.

In various examples, the display unit may remain unmoved, wherein the at least one actuator moving the coverglass is not mechanically coupled, or not directly mechanically coupled, to the display unit and/or the backlight unit, but in some examples to an anchor or support structure outside the touch panel structure. In other words, the display unit is mechanically decoupled from the coverglass, wherein the coverglass is not indirectly moved by moving the display unit for providing haptic feedback to the user. Likewise, the coverglass is mechanically decoupled from the display unit, and/or the backlight unit, wherein the display unit respectively the backlight unit is not moved, or actuated, by moving the coverglass, and or the actuators.

In various examples, the display unit may be a counter weight for the movement of the coverglass, in such a way that the counterweight may be used by the actuators as anchor and/or be moved in an opposite direction, and/or correspondingly to the coverglass, i.e. the coverglass may be decoupled from the display unit and moved in relation to the display unit for providing haptical feedback to the user.

The coverglass may be configured to be moved in relation to the display unit for providing haptical feedback, i.e. when providing haptical feedback, to the user.

The lower surface of the coverglass, or the sensor structure (e.g. in case of an on-glass solution), which is a surface directed to the display unit, may be covered with an anti-reflective coating, in particular a moth eye film.

Additionally, an upper surface of the display unit, specifically the upper surface of the polarizer, in which the upper surface may be directly adjacent to the lower side of the coverglass (or sensor structure) so that light may be reflected between them, may be covered with an anti-reflective coating, in particular a moth eye film.

Covering at least the lower surface of the coverglass of the sensor with an moth eye film provides a significant contribution to reduce the overall reflection of the touch panel system, as the polarizer usually has already lower reflectivity compared to the coverglass.

By the techniques according to the invention, an improved touch panel system is provided, which can provide haptic feedback to the user in more energy efficient way, with less acoustic noise, and reduced reflection. Furthermore, the touch panel system, in particular, the actuators moving at least parts of the touch panel system for forgiving haptical feedback to the user, may be designed and construed for reduced mechanical load and experience less mechanical stress, thus reducing the system overall cost.

Moving the coverglass, e.g. by actuators coupled to the coverglass, may provide haptical feedback with a short and direct mechanical transmission path to the user touching the coverglass and may at the same time, by additional anti-reflective (AR) coatings provide an improved reduction of the reflection of the display of the touch paneled interface under sunny conditions. In comparison with conventional systems, only the coverglass is moved, so the masses of the display and an illumination unit included in the display unit have not to be accelerated. This will reduce number of actuators, unwanted noise and system costs.

A method for providing haptic feedback to a user of a touch panel system comprises the following steps. In a first step, a touch panel system is provided, which comprises a display unit with a display surface for displaying information to a user, a touch sensor, or touch sensor structure, configured for detecting a touch input by the user, and a coverglass covering at least part of the touch sensor structure and the display surface towards the user and configured to be touched by the user during the touch input to the touch panel system, or touch sensor structure. In another step, a touch input by the user touching the coverglass is detected by the touch sensor structure. In a further step, haptic feedback is provided to the user by moving the coverglass, specifically the coverglass is moved in relation to the display unit.

In some examples, the display unit may remain unmoved in relation to the user, i.e. may not be moved together or parallel with the coverglass, for/while providing haptic feedback to the user, or may be moved as a counterweight in anti-parallel motion corresponding to the motion of the coverglass. In other words, the haptic feedback is provided to the user by movements of the coverglass, wherein at least the display unit may not be moved, i.e. not be moved in a parallel movement together with the coverglass, or, in some embodiments may be moved in a strongly reduced extend, in relation to the user body part touching the coverglass. The method may include a step of providing the lower surface of the coverglass or touch sensor structure with an anti-reflective coating, specifically a moth eye film. In various embodiments, additionally the upper surface of the display unit, specifically the polarizer, may be provided with an anti-reflective coating, in particular a moth eye film. Therein, the coverglass may be arranged, or mounted, in a predetermined distance d spaced from the display surface.

In some examples, the coverglass may be moved as a whole, or completely, wherein not only parts of the coverglass are moved using elastic deformation and other parts are fixedly mounted.

An electronic device comprises at least one touch panel system according to the present disclosure. The electronic device may be a handheld electronic device, in particular a mobile device, or a mobile phone.

A vehicle comprises at least one touch panel system according to the present disclosure. The touch panel system may be a touch panel on-board a vehicle, such as a touch panel of a vehicle console, or of an electrical divide integrated in a vehicle, or a touch panel control e.g. a touch panel control for navigation of a vehicle, a touch panel control for an entertainment system, or an environmental touch panel control. Likewise, the vehicle may comprise at least one display including a touch panel system according to the present disclosure.

A computer program product comprises program code to be executed by at least one processor of a computing device, wherein execution of the program code causes the computing device to execute one of the methods for providing haptic feedback to a user according to the present disclosure.

A computer-readable storage medium comprises instructions which, when executed by a computer, cause the computer to carry out one of the methods for providing haptic feedback to a user according to the present disclosure.

For such a method, electronic device, vehicle, computer program product, and computer-readable storage medium for providing haptic feedback to a user, technical effects may be achieved, which correspond to the technical effects described for the touch panel system.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION

Figure 1:
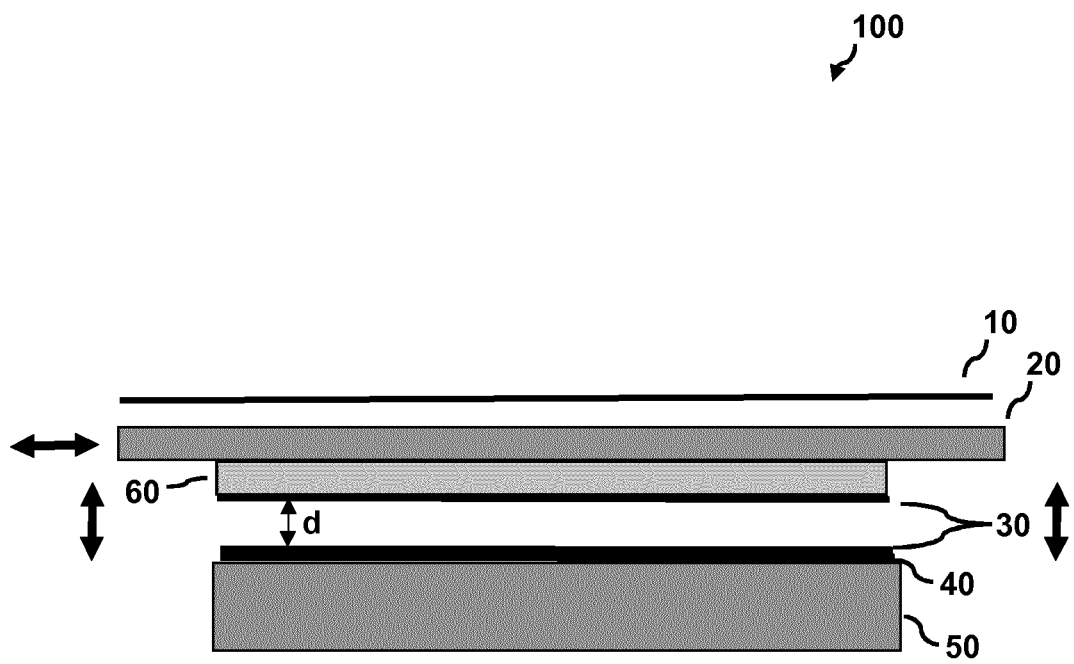
FIG. 1 schematically illustrates a touch sensor system, wherein a touch sensor is bonded on the coverglass backside, according to embodiments of the invention.

The above and other elements, features, steps, and concepts of the present disclosure will be more apparent from the following detailed description in accordance with exemplary embodiments of the invention, which will be explained with reference to the accompanying drawings.

It is to be understood that the following description of embodiments is not to be taken in a limiting sense. The scope of the invention is not intended to be limited by the embodiments described hereinafter or by the drawings, which are taken to be illustrative examples of the general inventive concept. The features of the various embodiments may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof. While electronic devices of an embodiment may be Human-Machine-Interfaces in an automotive environment, specifically in a vehicle, or may be handheld communication devices or other devices having a touch input interface operated by a user, the touch panel system is not limited to being used in such devices.

Many types of input devices are presently available for performing operations in a computing system, such as buttons or keys, mice, trackballs, joysticks, touch sensor panels, touch screens and the like. Touch panels, or touch screens, which in general terms are integrated tactile visual interfaces, are becoming increasingly popular because of their ease and versatility of operation as well as their declining price. Touch panel systems systems refer to electronic equipment, which enable users to interact with a computer by touching a display directly. Incorporating such a touch panel system that detects touch actions makes it possible to issue instructions to a computer by having it sense the position of a finger.

Touch screens may include a touch sensor with a coverglass, which can be a clear panel with a touch-sensitive surface, and a display unit such as a liquid crystal display (LCD) or Organic Light-Emitting Diode (OLED). The display unit may comprise a display surface, and may be an active matrix type display or screen using a pixel matrix. The display unit can be positioned partially or fully behind the coverglass so that the touch-sensitive surface covers at least a portion of the viewable area of the display device. Touch panel systems enable a user to perform various inputs or functions by physically touching the cover glass of the touch sensor panel using a finger, stylus or other object at a location often shown to the user by a human machine interface (HMI) displayed by the display unit behind the coverglass. In general, touch screens can recognize a physical touch and the position of the touch on the touch sensor panel, which is different from camera based gesture recognition systems, and the computing system can then interpret the touch in accordance with the display appearing at the time of the touch, and thereafter can perform one or more actions based on the touch. Many touch-panel sensing techniques used to sense touch input are known in the art, among them are resistive film, capacitive, surface acoustic wave (SAW), infrared optical imaging, and electromagnetic induction techniques.

The touch panel system may for a touch panel system for automobile dashboards, such as car navigation systems, HMIs in automotive environments, ATMs, ticket vending machines in railway stations, electronic kiosks inside convenience stores, digital photo printers at mass merchandisers, library information terminals, photocopiers, and the like.

Likewise, the touch panel system may be a touch panel system for an automotive device, Haptical feedback may refer to the perceptual system associated with touch. For example, haptical feedback facilitates a user to touch type, or in general recognize feedback like selection or activation of a function in response a user input to a touch panel system, or e.g. placement of a finger on the coverglass of the touch panel system in a certain region. Haptics does not refer to movement of the finger, but to feeling things, recognizing objects (even without looking at them), and controlling the interaction with a touch panel system. Haptical feedback by a movement of the surface touched by the user, in particular vibration, is a common form in electronic products, wherein it may be used to provide tactile feedback to the human hand (especially the fingertips) when using a touch surface, such as a touch panel system.

An anti-reflective or anti-reflection (AR) coating may refer to a type of optical coating applied to the surface of optical elements such as a lower or upper side of a coverglass, or a surface of a display, to suppress, reduce or dampen reflection from the respective surface. Typically, this improves the efficiency since less light is lost due to reflection. In more complex systems such as a touch panel system the reduction of reflections also improves the contrast of the displayed image, specifically by elimination of stray light and multiple reflexions between inner surfaces of the touch panel system, such as a display surface, a sensor surface and a lower coverglass surface. Many AR coatings consist of transparent thin film structures with alternating layers of contrasting refractive index, layer thicknesses are chosen to produce destructive interference in the beams reflected from the interfaces, and constructive interference in the corresponding transmitted beams. AR coating techniques known in the art are index-matching, single-layer interference, multi-layer interference, absorbing, circular polarizer, and textured coatings.

Textured coatings can be used as AR coatings, wherein reflection can be reduced by texturing a surface with 3D pyramids or 2D grooves (gratings). If wavelength is greater than the texture size, the texture behaves like a gradient-index film with reduced reflection. To calculate reflection in this case, effective medium approximations can be used. To minimize reflection, various profiles of pyramids have been proposed, such as cubic, quintic or integral exponential profiles. Antireflective properties of textured surfaces are well discussed in literature for a wide range of size-to-wavelength ratios (including long- and short-wave limits) to find the optimal texture size.

In particular, moths' eyes are covered with a natural nano-structured film, which eliminates reflections. As one example of many moth eye structures, a moth eye structure may e.g. include a hexagonal pattern of bumps, each roughly 200 nm high and spaced on 300 nm centers. In this example of an antireflective moth eye coating, the AR effect is provided as the bumps are smaller than the wavelength of visible light, so the light sees the surface as having a continuous refractive index gradient between the air and the medium, which decreases reflection by effectively removing the air-glass interface.

Conventional touchpanel systems consist of a display unit, a touch sensor and a coverglass bonded on the sensor surface, or a sensor applied direct on the coverglass backside (i.e. on glass solution). Actuators are moving the complete unit including display module, and if applicable backlight unit, in x, y or z direction when the sensor detects a touch signal. The actuator provides a haptical feedback to the user by moving the display, sensor and coverglass.

The disadvantages of the conventional systems are the accelerated masses of the display, touchpanel and coverglass. Unwanted noise is emitted from the system. Much energy is needed and system costs are increased due to the high masses that have to be accelerated.

In the following, detailed descriptions for a touch panel system, in other words a touch panel or touch display, with haptic feedback, and a method for providing haptical feedback to a user, in accordance with aspects and embodiments of the invention, will be explained.

FIG. 1 schematically illustrates a touch sensor system 100, wherein a touch sensor structure 60 is bonded on the coverglass 20 backside, according to embodiments of the invention.

As depicted in FIG. 1, the touch panel system 100, which may specifically be a touch panel system in an automotive environment, e.g. on-board a vehicle, comprises a display unit 50. Display unit 50 has a display surface 40, or in other words an upside, which is directed to a user and on which information is displayed to the user. In this embodiment, display unit 50 comprises a polarizer, or front polarizer, as the uppermost or outer layer of display unit 50, in other words, the surface of the polarizer represents the display surface 40 of the display unit 50. The touch panel system 100 may in some embodiments comprise an illumination unit, or backlight unit (not shown), wherein in some examples, the display unit 50 may comprise the illumination unit.

Further, the touch panel system 100 comprises a coverglass 20. The coverglass 20 is combined with a sensor structure 60 of a capacitive touch panel system. The coverglass 20 has a front side, or upside, which is directed towards the user, and a backside, which is directed towards the display unit 50.

In general, an upside, or upper side, or front side of a component may refer to the side directed towards the user and a backside, or lower side of the component is directed towards the inside of the touch panel system 100, i.e. the direction away from the user, towards the touch panel system or towards the display unit 50. A z-direction may refer to the direction perpendicular to the display surface 40, or perpendicular to the plane of the display surface 40 and the coverglass 20, which are parallel to each other, whereas a x- and a y-direction may refer to directions perpendicular to the z-direction and in-plane directions with regard to the plans of the display surface 40 and/or plane of the coverglass 20.

As can be taken from FIG. 1, the coverglass 20 is decoupled from display unit 50. Therein, the touch sensor structure 60, or more generally touch sensor 60, extends along at least part of the display surface 40, and is bonded on the coverglass 20, specifically the backside of coverglass 20. This solution may be referred to as on-glass solution, or on-glass touch sensor structure 60.

The backside surface of the touch panel sensor structure 60 is located on the side towards the front polarizer of the 60, which can be a LCD display or an OLED display. The upside of coverglass 20 is covered with a reflection-reducing and/or anti-scratch surface coating 10.

In FIG. 1, the coverglass 20 and sensor structure 60 is arranged or mounted in a distance d of the display unit 50. In other words, a coverglass assembly, comprising at least the coverglass 20 and not comprising the display unit 50, is arranged in a distance d from the surface 40 of the display unit 50, or more generally from the display unit 50. By the distance d, opposite inner surfaces are defined at both sides of the distance d, which may be a space or an airgap, wherein the one inner surface is the display surface 40 of the display unit 50, and the second inner surface is the lower side of the touch sensor structure 60.

An anti-reflecting (AR) coating 30, in other words, a reflection reducing film, may be applied to at least one of the opposite inner surfaces. In the example of FIG. 1, both inner surfaces are coated with a moth eye structured surface. Specifically, a a moth eye structured film is applied on the polarizer surface of the display unit 50 and a second a moth eye structured film is applied on the opposite surface on the sensor side. The film may be configured to reduce the surface reflections to values <1%. Specifically, by arranging the coverglass 20 movably in a distance with a gap to the display surface 40 of display unit 50, using 3D nanostructure films, in particular moth eye films, is enabled, which are easily destroyed by mechanical contact and provide particularly good anti-reflection effects.

The described touch panel system 100 suppresses the incoming light and avoids the lightbouncing between the inner surfaces, i.e. the display surface 40 and the lower surface of the coverglass 20 assembly, specifically in FIG. 1, the polarizer surface and the inner coverglass side. The surprising effect is independent of the distance between the display surface 40 and the sensor surface, so an optical effect will not be visible during the movement of the coverglass, i.e. by an actuator, in z-direction. Also the movement in x- and y-direction will not have an influence to the total reflection value of the system. By the at least one AR coating, specifically moth eye films on both sides of the inner space d, the readability of the display at sunlight conditions is improved. The total reflection of display and touchpanel is in a range of a bonded touchpanel solution.

Moving the coverglass 20 in-plane of the display and/or perpendicular to the plane, as indicated with the arrows, e.g. by actuators (not displayed in FIG. 1) directly or indirectly connected or coupled with the coverglass, may provide a haptical feedback to the user and will keep the reduction of the reflection on the display system. At least one actuator may be connected with the coverglass outside the viewing area of the display unit. In comparison with conventional touch panel systems with haptical feedback, where the complete touch panel system is moved, e.g. vibrated, (by moving the display unit and/or the illumination unit together, in other words in the same movement, or in parallel, with the coverglass), according to the invention only the coverglass is moved, so the masses of the display and illumination unit have not to be accelerated. This will reduce number of actuators needed for providing clear perceptive haptical feedback, with short acceleration times, avoid unwanted noise and lower system costs.

Figure 2:
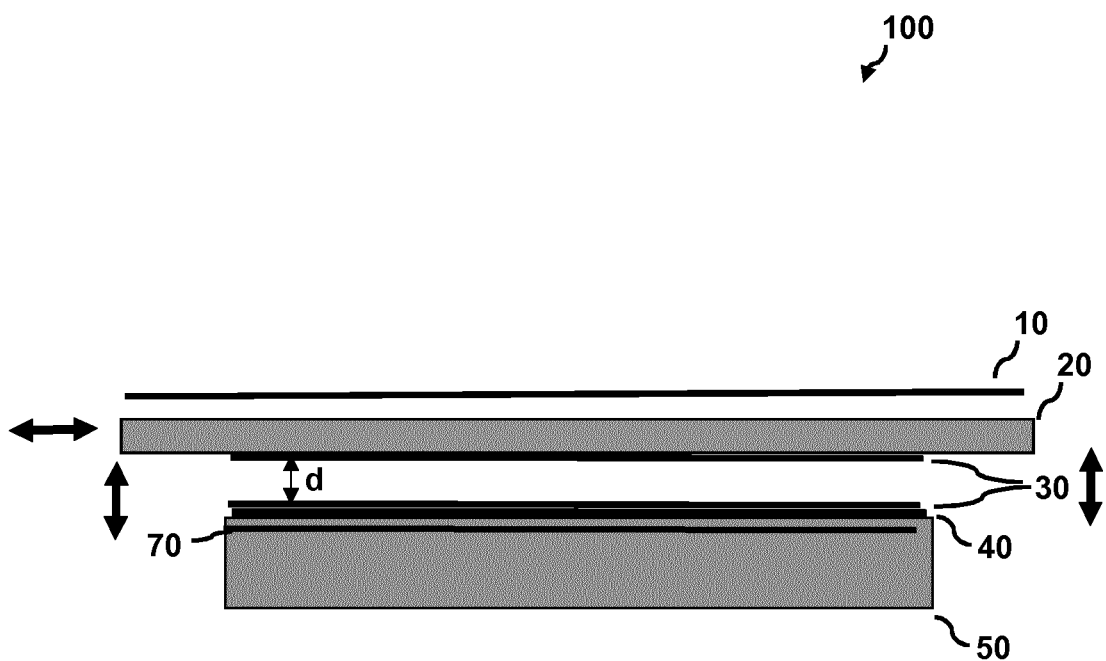
FIG. 2 schematically illustrates a touch sensor system, wherein a touch sensor is integrated inside the display structure, according to embodiments of the invention.
Figure 3:
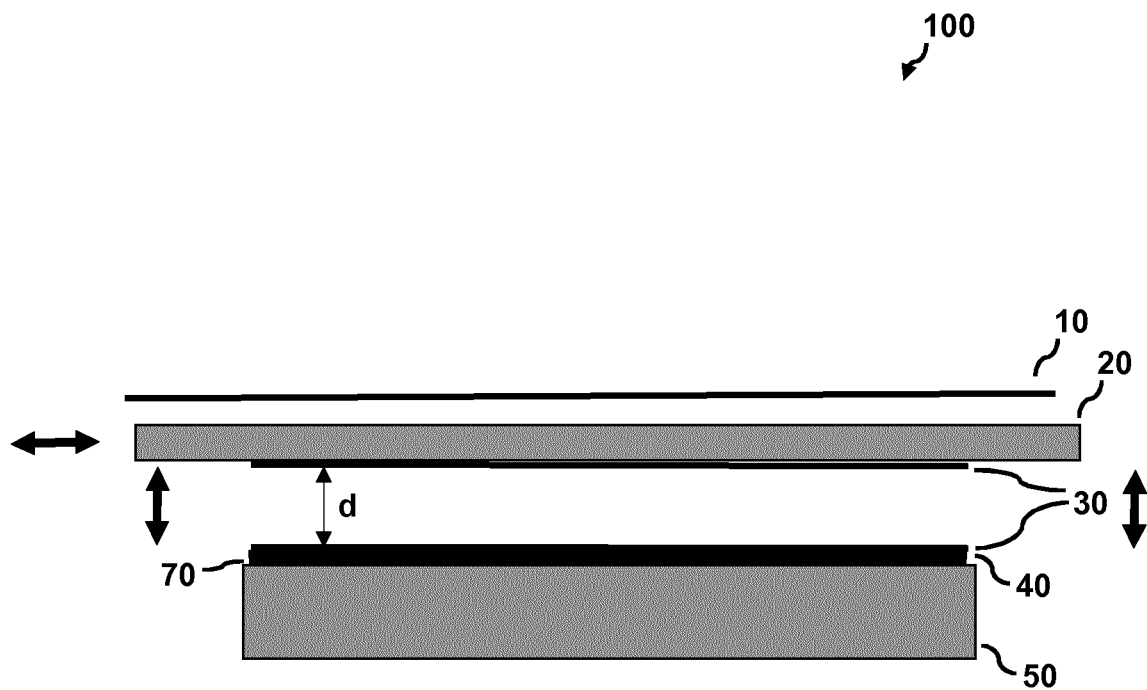
FIG. 3 schematically illustrates a touch sensor system, wherein a touch sensor is arranged outside the display structure on the outer glass surface of the display, according to embodiments of the invention.

FIG. 2 and FIG. 3 are showing examples with a touch sensor 60 integrated inside the display structure, which may be referred to as in-cell solution, or in-cell touch sensor structure 60, or the the touch sensor 60 may be outside the display structure, on the outer glass surface of the display unit 50, which may be referred to as on-cell solution, or on-cell touch sensor structure 60.

FIG. 2 schematically illustrates a touch sensor system 100, wherein a touch sensor 60 is integrated inside the display structure 50, according to embodiments of the invention.

The touch panel system 100 depicted in FIG. 2 is configured similar to the touch panel system shown in FIG. 1, wherein, different from FIG. 1, the touch center structure 60 is integrated inside the display unit 50. The coverglass 20 is arranged in a distance or space d from the display surface 40, similar as in FIG. 1.

FIG. 3 schematically illustrates a touch sensor system 100, wherein a touch sensor 60 is arranged outside the display structure 50 on the outer glass surface of the display unit 50, according to embodiments of the invention.

The touch panel system 100 depicted in FIG. 3 is configured similar to the touch panel system shown in FIGS. 1 and 2, wherein, different from FIGS. 1 and 2, the touch center structure 60 is arranged outside unit 50 and under the front polarizer of the display unit 50. The coverglass 20 is arranged in a distance or space d from the display surface 40 in a similar way as described for FIG. 1.

In the examples of FIGS. 2 and 3, the touchsensor structure 60 is located under the display polarizer and is not moved during a haptical feedback phase.

As depicted in FIG. 2 and FIG. 3, the reflection surprising moth eye films 30 are located on both inner surfaces of the distance d, i.e. on the display front polarizer and the opposite surface of the sensor glass. In that constellation, the incoming light is suppressed, the bouncing of the light between the surfaces is reduced, the readability under sunlight condition is improved. Moving only the coverglass 20, or coverlens, for haptical feedback will reduce the mass of the accelerated parts, reduce the noise and the energy needed to provide a haptical feedback.

Figure 4:
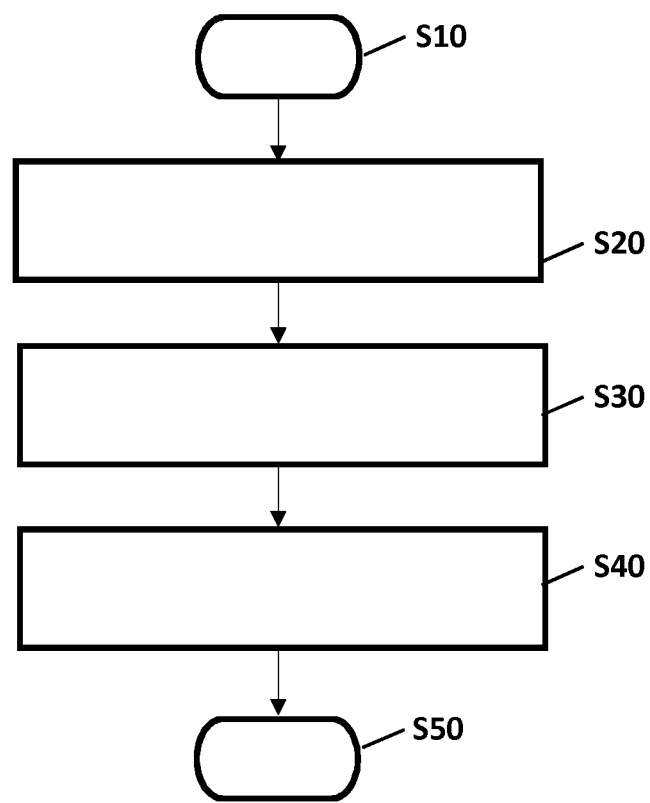
FIG. 4 illustrates a flow chart of a method for operating a touch panel system, according to embodiments of the invention.

FIG. 4 illustrates a flow chart of a method for operating a touch panel system 100, according to embodiments of the invention.

A method for providing haptic feedback for a touch panel system 100 starts in step S10. In step S20, a touch panel system 100 is provided. The touch panel system 100 comprises a display unit 50 comprising a display surface 40 for displaying information to a user, a touch sensor structure 60 configured for detecting a touch input by the user, and a coverglass covering the touch sensor structure 60 and the display surface 40 towards the user and configured to be touched by the user during the touch input to the touch sensor structure 60. In step S30, a touch input of the user to the outer surface of coverglass 20 is detected by touch center structure 60. In step S40, haptic feedback is provided to the user, i.e. the body part of the user touching the coverglass 20, by the coverglass 20, by moving the coverglass 20 in relation to the body part of the user touching the coverglass 20 and in relation to the display unit 50. The method ends in step S50.

In various examples, the touch panel system 100 may be contained in, or in other words supported by a housing (not depicted). The coverglass 20 may be moved in relation to the housing during haptical feedback. In various examples, the display unit 50 may comprise an illumination unit of the display unit 50, and in general the touch panel system may comprise other functional entities as known in the art. In this regard, the schematic illustrations of FIGS. 1 to 3 are not intended to be limited, while they are based on the principles that at least or only the part, that is touched by the user, i.e. in various embodiments at least the coverglass 20 touched by the user, is moved for providing haptical feedback to the user. In various examples, housing of the touch panel system 100 may support the display unit 50, wherein the coverglass 20 may be is moved in relation to the housing and/or display unit 50.

Figure 5:
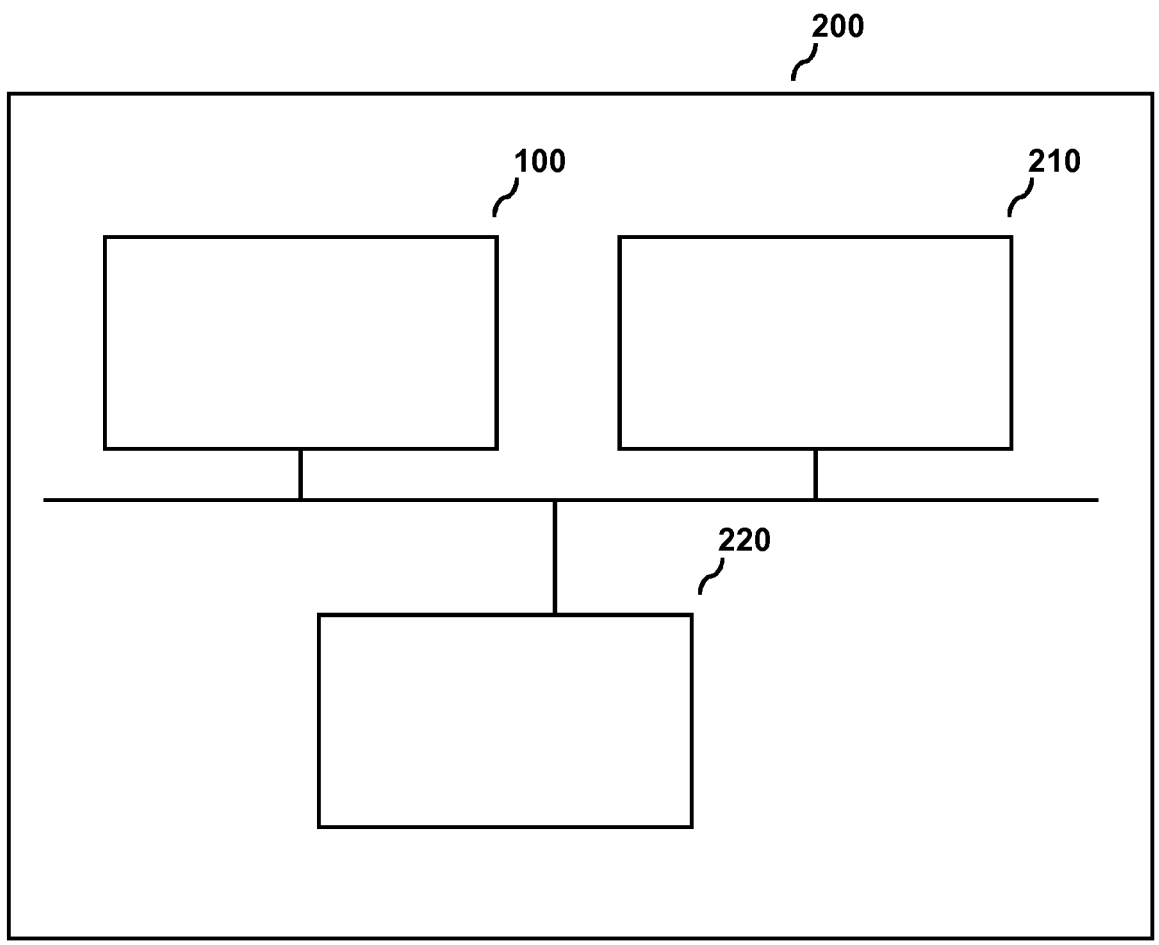
FIG. 5 schematically illustrates an electrical device comprising a touch sensor system, according to embodiments of the invention.

FIG. 5 schematically illustrates an electrical device 200 comprising a touch sensors system 100, according to embodiments of the invention. The electrical device may be a handheld electrical device, or it may be an electrical device in an automotive environment, such as an electrical device mounted or integrated in a vehicle.

The electrical device comprises a touch panel system 100, at least one processor 210 and and memory 220. The memory 220 comprises program code to be executed by the at least one processor 210 of computing device 200. Therein, the execution of the program code causes the at least one processor 210 to execute one of the methods for providing haptic feedback to a user according to the present disclosure.

In various embodiments, the electrical device 1 may include an input interface, which may comprise a touch panel system 100. According to various examples, the touch panel system may include a touch sensor structure 60, which is a proximity-sensitive touch sensor array extending along a display surface. The input surface may be defined by a coverglass, or window, which is overlaid onto display unit 50. The touch panel system 100 may comprise a display unit 50, thereby implementing a touch-sensitive screen. The handheld device 200 has at least one processor 210 coupled to the touch panel system 100. The processing device 4 may comprise an application specific integrated circuit and/or one or plural processors. For illustration, the functions of the processing device 4 described below may be performed by a controller 12 of a touch sensor panel. Alternatively or additionally, the functions of the processing device 4 described below may also be performed by an application processor 11 of the handheld device 200. The at least one processor 210 may be configured such that, at least in some modes of operation, it determines an offset-corrected actuation location by processing data captured by the proximity-sensitive touch sensor array. The at least one processor 210 may determine how the distance between the finger and the input surface varies as a function of position.

The electric device 200 may be operative as a handheld communication device, e.g. a cellular telephone, a personal digital assistant, a handheld computer or similar, or may be a console or part of a console in a vehicle. The electric device 200 may include components for voice communication, which may include a microphone 6, a speaker 7, and a wireless communication interface 9 for communication with a wireless communication network. In addition to the touch panel system 100, the electric device 200 may have separate hard keys 8, such as function and/or control keys, which may be supported on a housing 10 of the electronic device 1. In some embodiments, the electronic device may also comprise a force sensor 13. The force sensor 13 may be operative to determine a force with which a finger or multiple fingers is/are pressed against the coverglass 20. The at least one processor 211 may be operative to perform different functions depending on the force that is sensed. The force may act as an additional input coordinate, sometimes also referred to as "z-coordinate" for actuation operations. The at least one processor 210 may be operative to control the at least one actuator to move the coverglass 20 to provide haptical feedback to the user, by controlling the coverglass 20 to perform movements in-plane, in x- and/or y-direction, and/or in z-direction.

From the above said, some general conclusions may be drawn:

The coverglass 20 may be movable or configured to be moved, or in other words actuated by at least one actuator, in z-direction, i.e. perpendicular to the display surface 40, and/or perpendicular to the plane of the coverglass, i.e. in x- and/or y-direction, in order to provide, and/or while providing, haptic feedback to the user.

A display unit 50 may be one of a LCD or OLED display, or in some embodiments a simple indicator such as e.g. a masked light emitting unit. It is to be appreciated, that the techniques of the display unit 50 may comprise any display techniques known in the art.

The coverglass 20 may be connected to and moved in relation to the display unit by at least one actuator for providing haptical feedback to the user, wherein the display unit and/or a backlight unit, may remain unmoved by the actuator in relation to the user, in other words, the display unit and/or an illumination unit, i.e. the backlight unit, may not be directly connected or coupled to the at least one actuator.

The coverglass 20 may be movable or configured to move in in-plane with regard to the plane of the coverglass, i.e. parallel to the display surface 40, which may be a movement in x- and/or y-direction, for providing haptic feedback to the user. Providing haptic feedback by moving a touch surface in a transversal direction, or in-plane with regard to touched surface may provide particularly precise optical feedback and facilitate construction of an support or fixture of the movable coverglass.

The coverglass may be arranged in a predetermined distance d spaced from the display surface 40 of the display unit 50, in various embodiments the coverglass may be arranged in a distance d along the display surface, or at least the visible (by the user) part of the display surface 40.

At least one of the internal surfaces defined at both sides of the predetermined distance d may be covered with an anti-reflective coating. This enables e.g. better readability under sunlight conditions.

The touch sensor structure 60 may be an on-glass touch sensor structure, or an in-cell touch sensor structure, or an on-cell touch sensor structure.

The touch sensor structure 60 may be an on-glass touch sensor structure extending and attached along a lower surface of the coverglass, wherein at least one of a lower surface of the touch sensor structure 60 and the display surface 40 is covered with an anti-reflective coating 30.

The touch sensor structure 60 may be an in-cell touch sensor structure or an on-cell touch sensor structure, wherein at least one of a lower surface of the coverglass and the display surface 40 is covered with an anti-reflective coating 30.

The anti-reflective (AR) coating 30 may be a (3-D) nano-structured anti-reflective coating, specifically a moth eye film.

The coverglass may be arranged with an airgap from the surface of the display unit 50.

Both internal surfaces of the airgap may be coated with a moth-eye film.

Summarizing, in the field of touch sensitive displays, a touch panel system is provided, which comprises a display unit, a touch sensor structure and a coverglass, wherein a user touches the coverglass during touch input to the touch sensor structure, wherein the coverglass is configured to be moved in relation to the display unit for providing haptical feedback to the user. Further, the coverglass is arranged or mounted in a predetermined distance d from the display unit, such that the coverglass and the display unit are separated from each other by a empty space. The opposite inner surfaces defined by the distance d are coated with an anti-reflecting coating, in particular a moth eye film.

Thereby, the improved touch panel for haptic feedback and method for providing haptic feedback enable haptic feedback to the user in more energy efficient way, with less acoustic noise. Actuators for moving at least parts of the touch panel system for providing haptical feedback to the user may be designed for a lower mechanical stress thus reducing the system overall cost.

Although the invention has been shown and described with respect to certain preferred embodiments, equivalents and modifications will occur to others skilled in the art upon reading and understanding the specification. The present invention includes all such equivalents and modifications and is limited only by the scope of the appended claims.

The invention claimed is:

1. A touch panel system comprising:
    a display unit, which comprises a display surface to display information to a user;
    a touch sensor structure configured to detect a touch input by the user; and
    a coverglass to cover the touch sensor structure and the display surface towards the user, and is the coverglass being configured to be touched by the user during the touch input to the touch sensor structure;
    wherein the coverglass is configured to be moved in relation to the display unit to provide a haptical feedback to the user,
    wherein the touch sensor structure is an on-glass touch sensor structure extending and attached along a lower surface of the coverglass,
    wherein the display surface directly receives a first anti-reflective coatings,
    wherein a second anti-reflective coating is positioned directly on the coverglass and a third anti-reflective coating is positioned directly on the touch sensor structure,
    wherein the coverglass and the display surface define an air gap therebetween;

wherein the coverglass is moved relative to the display unit within the air gap by at least one actuator to provide haptical feedback to the user, wherein the display unit remains unmoved by the at least one actuator as the coverglass moves relative to the display unit in the air gap; and wherein the third anti-reflective coating positioned on the touch sensor structure moves in the air gap toward the first anti-reflective coating positioned on the display surface in response to the at least one actuator moving the coverglass toward the display unit.

2. The touch panel system of claim 1, wherein a lower surface of the coverglass, or a lower surface of the touch sensor structure, is covered with a moth eye film.

3. The touch panel system of claim 1, wherein the coverglass is movable parallel to the display surface.

4. The touch panel system of claim 1, wherein the coverglass is movable perpendicular to the display surface.

5. The touch panel system of claim 1, wherein the touch sensor structure is an in-cell touch sensor structure or an on-cell touch sensor structure and wherein at least one of a lower surface of the coverglass is covered with the second anti-reflective coating and the display surface is covered with the first anti-reflective coating.

6. The touch panel system of claim 5, wherein the first anti-reflective coating is a 3-D nano-structured anti-reflective coating such as a moth eye film.

7. The touch panel system of claim 1, wherein the coverglass is arranged with an air gap from a surface of the display unit.

8. The touch panel system of claim 7, wherein the air gap includes internal surfaces, and the internal surfaces of the air gap are coated with a moth-eye film.

9. The touch panel system of claim 1, wherein the first anti-reflective coating and the third anti-reflective coating define the air gap therebetween to separate the touch sensor structure and the coverglass.

10. The touch panel system of claim 1, wherein the coverglass is arranged in a predetermined distance (d) from the display surface, and wherein at least one surface of the coverglass and the display surface defined at both sides of the predetermined distance (d) is covered with a 3-D nano-structured anti-reflective coating.

11. The touch panel system of claim 1, wherein the coverglass separates the second anti-reflective coating from the third anti-reflective coating.

12. The touch panel system of claim 1, wherein the first anti-reflective coating as received by the display surface is formed of a 3D nano-structured layer and the third anti-reflective coating as positioned on the touch sensor structure is formed of the 3D nano-structured layer.

13. A method for providing haptic feedback by a touch panel system, the method comprising:
providing a touch panel system comprising:
displaying information, via a display unit including a display surface, to a user;
detecting via a touch sensor structure of the touch panel system, a touch input by the user;
covering the touch sensor structure and the display surface towards the user, via a coverglass to be touched by the user while the touch input is received at the touch sensor structure;
detecting a touch input by the user to the coverglass; and
providing a haptical feedback to the user by moving the coverglass in relation to the display unit,
positioning the touch sensor structure on an on-glass touch sensor structure that extends and is attached along a lower surface of the coverglass,
directly receiving, at the display surface, a first anti-reflective coating;
directly receiving at the coverglass, a second anti-reflective coating;
directly receiving at the touch sensor structure, a third anti-reflective coating;
forming an air gap between the coverglass and the display unit; and
moving the coverglass relative to the display unit in the air gap by at least one actuator to provide haptical feedback to the user,
wherein the display unit remains unmoved by the at least one actuator as the coverglass moves relative to the display unit in the air gap; and
wherein moving the coverglass relative to the display unit further includes moving the third anti-reflective coating positioned on the touch sensor structure in the air gap toward the first anti-reflective coating positioned on the display surface in response to the at least one actuator moving the coverglass toward the display unit.

14. An electronic device comprising the touch panel system of claim 1.

15. A vehicle comprising a display comprising the touch panel system of claim 1.

16. A touch panel system comprising:
a display unit to display information to a user;
a touch sensor structure configured to detect a touch input by the user; and
a coverglass to cover the touch sensor structure and a display surface, the coverglass being configured to be touched by the user during the touch input to the touch sensor structure;
wherein the coverglass is configured to be moved relative to the display unit to provide a haptical feedback to the user,
wherein the touch sensor structure is positioned on an on-glass touch sensor structure extending and attached along a lower surface of the coverglass,
wherein the display surface directly receives a first anti-reflective coating,
wherein a second anti-reflective coating is positioned directly on the coverglass and a third anti-reflective coating is positioned directly on the touch sensor structure,
wherein the coverglass and the display surface define an air gap therebetween;
wherein the coverglass is connected to and moved relative to the display unit within the air gap by at least one actuator to provide haptical feedback to the user, wherein the display unit remains unmoved by the at least one actuator as the coverglass moves relative to the display unit in the air gap; and
wherein the third anti-reflective coating positioned on the touch sensor structure moves in the air gap toward the first anti-reflective coating positioned on the display surface in response to the at least one actuator moving the coverglass toward the display unit.

17. The touch panel system of claim 16, wherein a lower surface of the coverglass, or a lower surface of the touch sensor structure, is covered with a moth eye film.

18. The touch panel system of claim 16, wherein the coverglass is movable parallel to the display surface.

19. The touch panel system of claim 16, wherein the coverglass is movable perpendicular to the display surface.

* * * * *